United States Patent [19]

Long

[11] Patent Number: 5,377,260
[45] Date of Patent: Dec. 27, 1994

[54] TELEPHONE CIRCUIT TO CONTROL OFF-HOOK STATUS DURING RECEIPT OF CALLER-ID SIGNAL

[75] Inventor: David K. Long, Los Altos, Calif.

[73] Assignee: Sierra Semiconductor Corporation, San Jose, Calif.

[21] Appl. No.: 802,627

[22] Filed: Dec. 5, 1991

[51] Int. Cl.⁵ .......................................... H04M 11/00
[52] U.S. Cl. ..................................... 379/95; 379/142; 379/93; 379/94; 379/98
[58] Field of Search ................. 379/142, 94, 100, 96, 379/97, 98, 95

[56] References Cited

U.S. PATENT DOCUMENTS

| | | | |
|---|---|---|---|
| 4,924,496 | 5/1990 | Figg et al. | 379/142 |
| 4,942,598 | 7/1990 | Davis | 379/142 |
| 4,985,913 | 1/1991 | Shalon et al. | 379/142 |
| 4,994,926 | 2/1991 | Gordon et al. | 358/440 |
| 4,996,704 | 2/1991 | Brunson | 379/67 |
| 5,001,710 | 3/1991 | Gawrys et al. | 379/142 |
| 5,003,595 | 3/1991 | Collins et al. | 379/142 |
| 5,023,904 | 6/1991 | Kaplan et al. | 379/142 |
| 5,054,055 | 10/1991 | Hanle et al. | 379/96 |
| 5,121,423 | 6/1992 | Morihiro et al. | 379/100 |
| 5,146,489 | 9/1992 | Telibasa | 379/97 |

FOREIGN PATENT DOCUMENTS 0086659  4/1988  Japan .................................. 379/95

Primary Examiner—Curtis Kuntz
Assistant Examiner—Stella G. Woo
Attorney, Agent, or Firm—Burns, Doane, Swecker & Mathis

[57] ABSTRACT

A telephone system includes a data modem that is coupled to a control microprocessor and a Data Access Arrangement (DAA) for detecting a Caller ID. The detected information is used to select a specific action dependent upon the specific Caller ID. Only one relay is needed with no other parts to connect the Caller ID to the data modem. A programmed Intelligent Work Station (IWS) determines whether to respond to the call and the type of response.

3 Claims, 6 Drawing Sheets

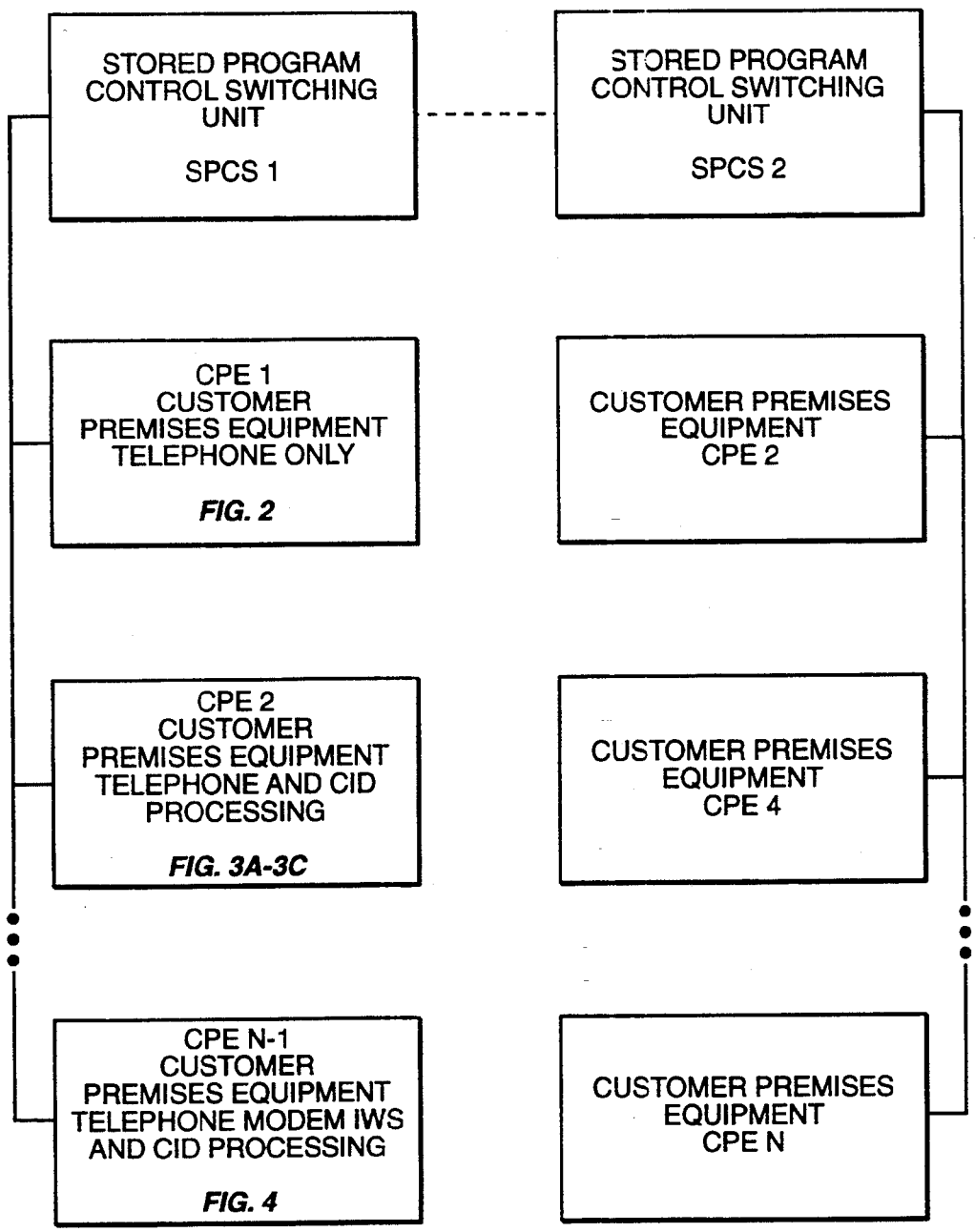
FIG._1

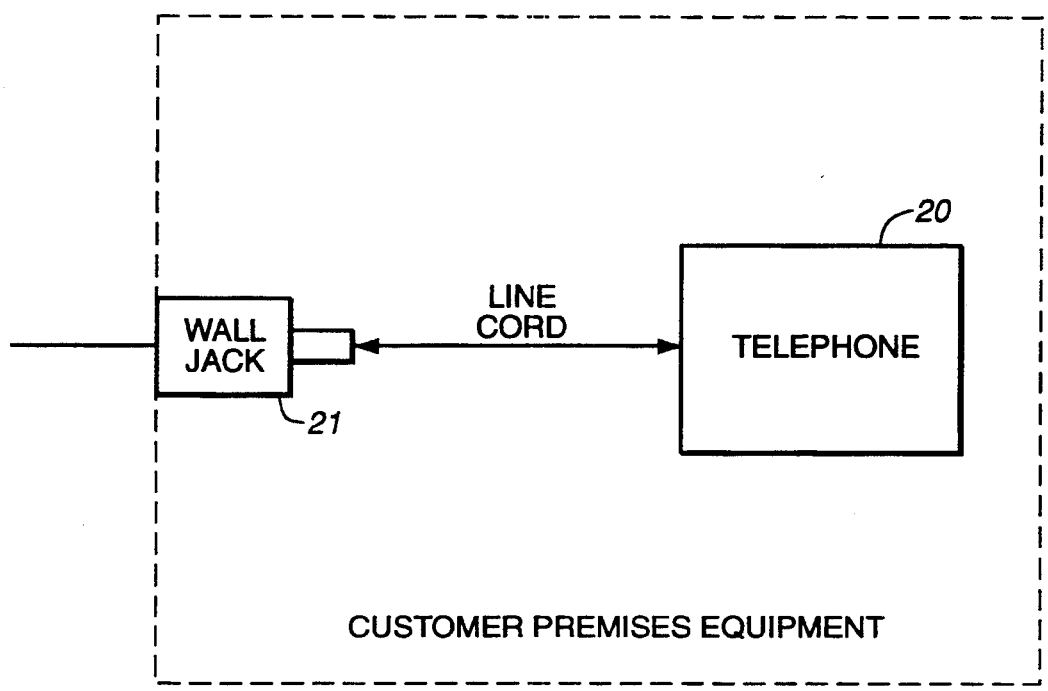
FIG._2
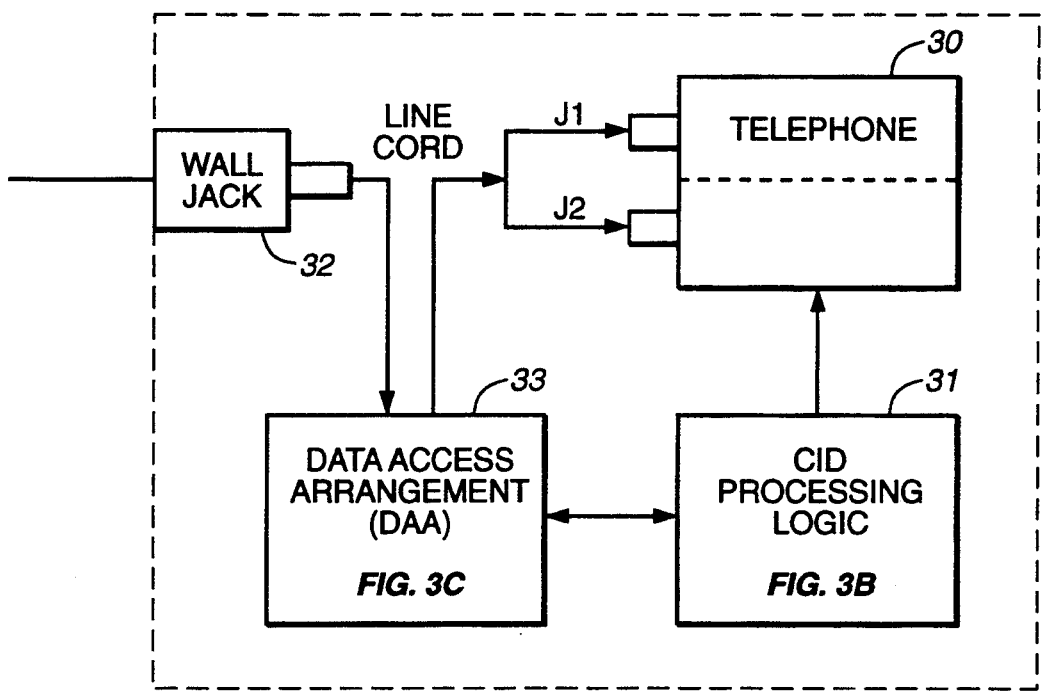
FIG._3A

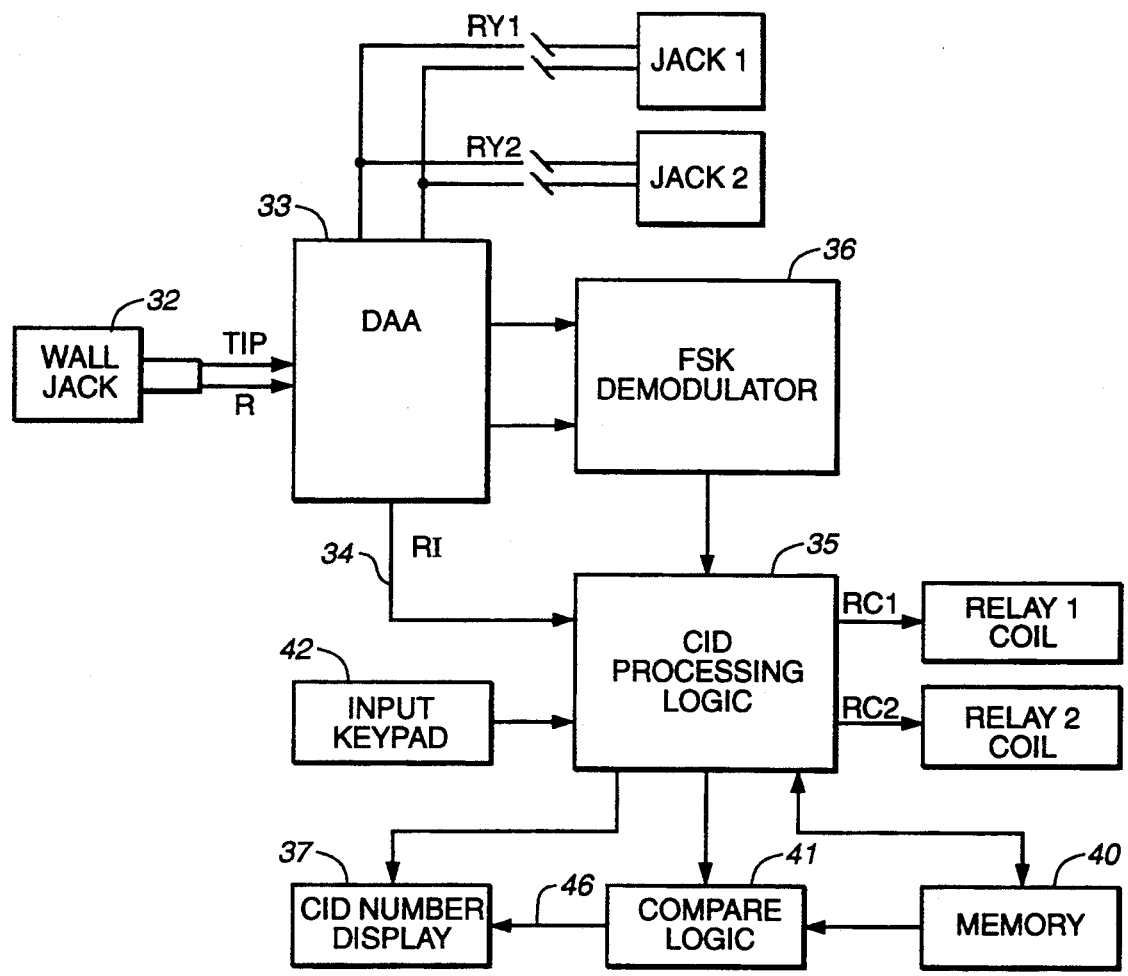
FIG._3B

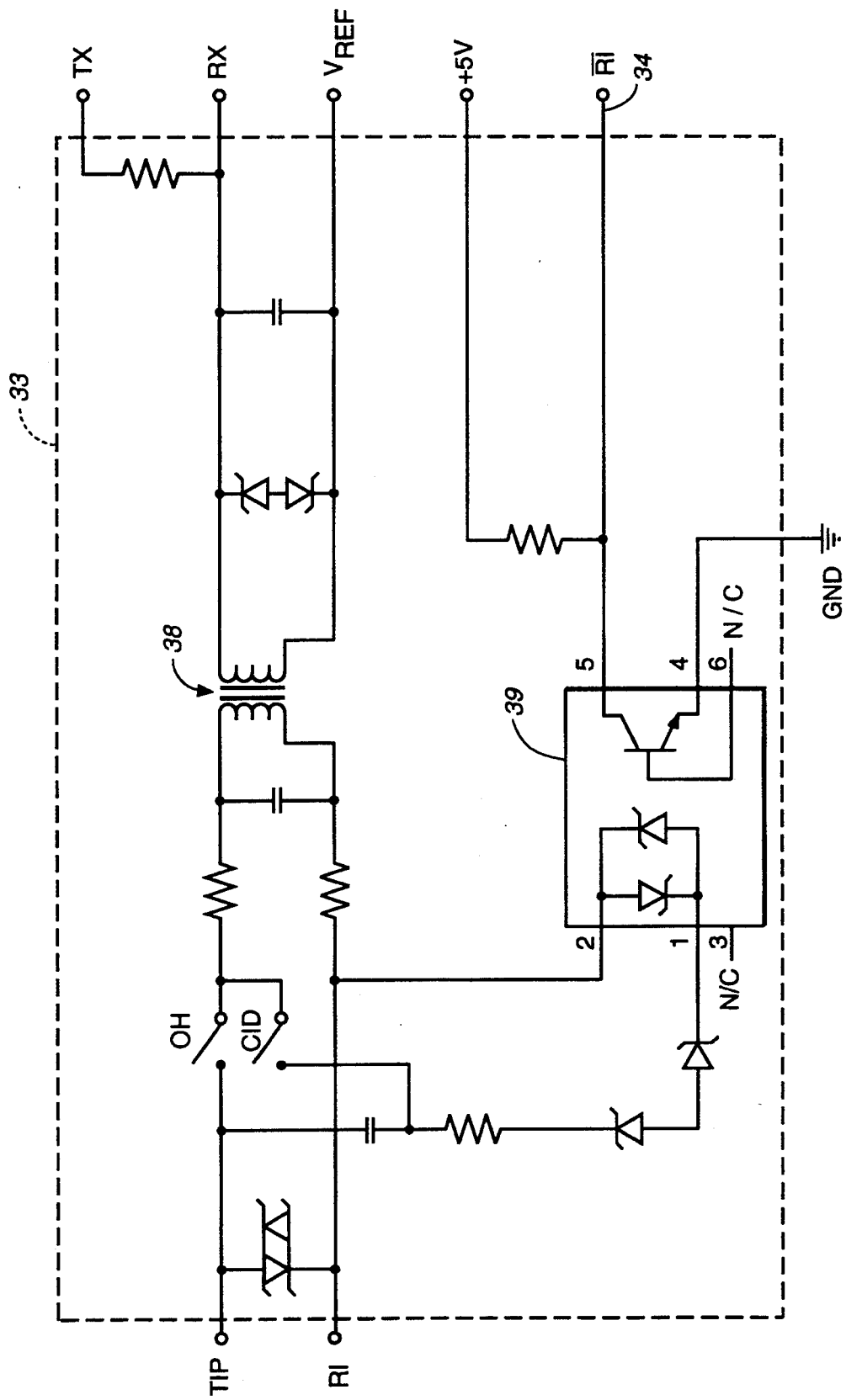
FIG._3C

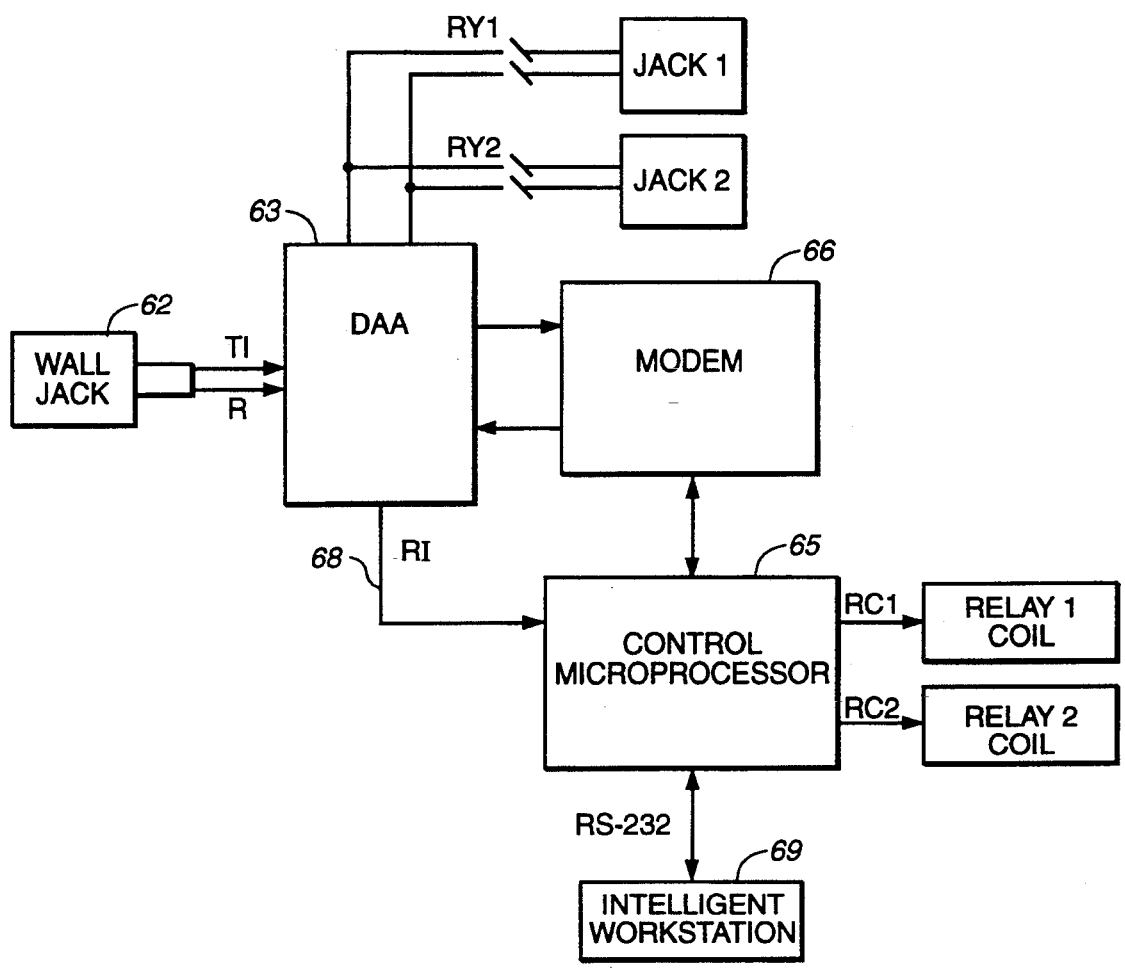
FIG._4

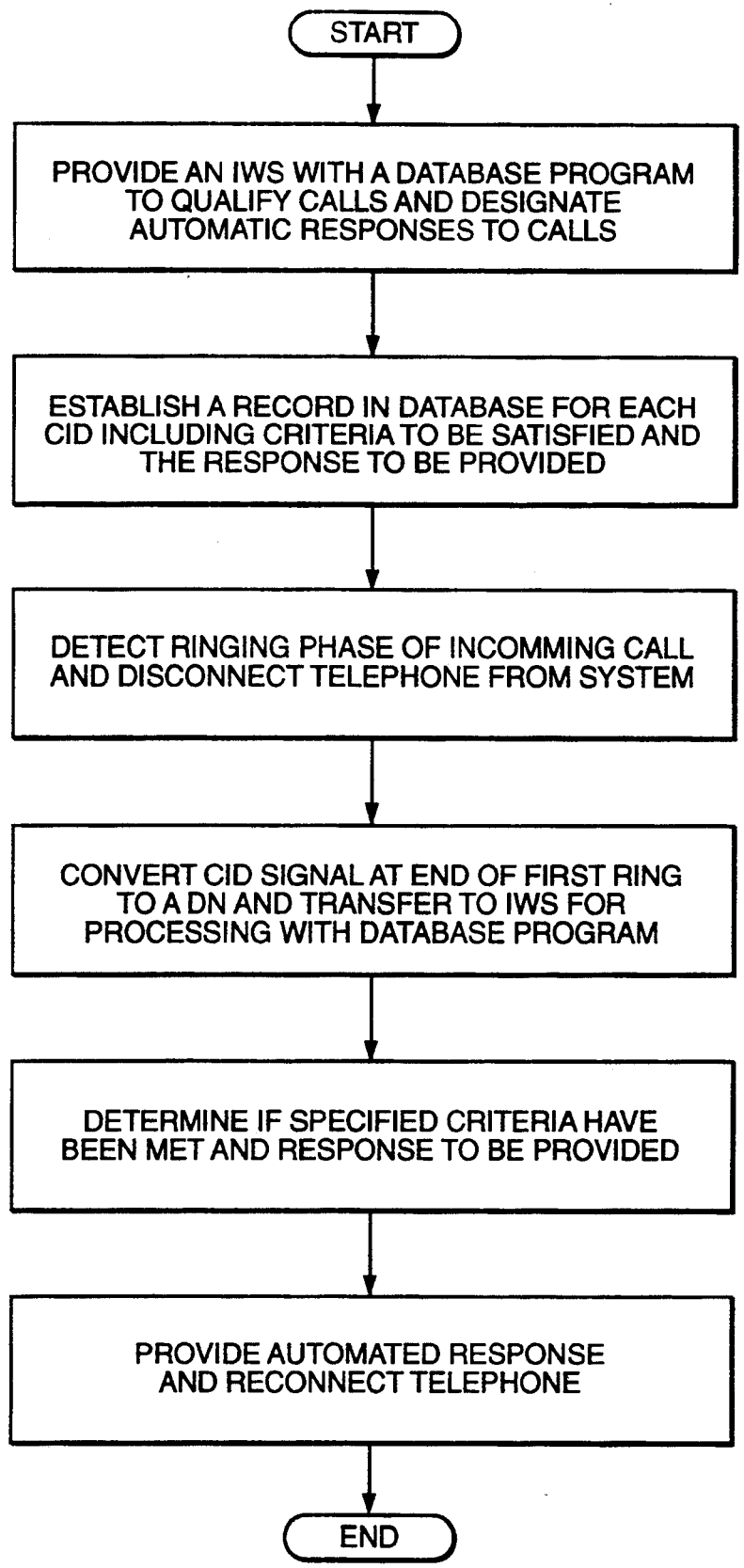
FIG._5

TELEPHONE CIRCUIT TO CONTROL OFF-HOOK STATUS DURING RECEIPT OF CALLER-ID SIGNAL

FIELD OF THE INVENTION

This invention relates in general to telephone systems which transmit a Caller-ID (CID) signal on the Customer Loop established during the Power Ringing phase of a call and for a hardware and firmware method of adding such capability to a data modem, and in particular to a circuit arrangement for controlling the connection of various types of Customer Premises Equipment to the established Customer Loop selectively, based on the received CID signal.

BACKGROUND OF THE INVENTION

Telephone systems typically provide an analog signal path for voice communication from one telephone subscriber to another. In such systems a customer's telephone is assigned a Directory Number (DN), for example, a 3 digit exchange code and a 4 digit number. The telephone is connected through telephone lines to a telephone switching center whose function is to interconnect the telephone of the calling subscriber to the telephone of the called subscriber. The switching center, which comprises large banks of electromechanical switches, completes the physical connection to the telephone of the called party. An alternating current ringing signal is sent to the called telephone along with a direct current signal supplied generally from a battery at the switching center. The function of the ringing signal is to cause a bell to ring at the called telephone. The called party then lifts the "receiver" from the hook. The act of lifting the hook closes a pair of contacts, which in turn causes the customer loop back to the switching center to be completed. Since the customer loop is completed back to the switching center, the "Off-Hook" state is detected at the center by monitoring the direct current from the battery. Detecting the "Off-Hook" status causes the ring signal to terminate and permits voice communication over the customer loop. If the called party is connected to a different exchange, the local switching center first connects to the remote switching center and the remote center completes the call.

Most state of the art telephone systems replaced the electromechanical switching units with stored program digital computers. This newer equipment, generally referred to as a Stored Program Control Switching System or an SPCS unit, in addition to performing all of the functions of the earlier switching centers, the SPCS units, allow the telephone companies to provide various additional functions that may prove useful to many customers.

The advent of digital computers also created the desire to transmit digital data between telephone system customers. A typical state of the art telephone system must now service various communication products at the customer's premises. This equipment is referred to as Customer Premises Equipment (CPE) and includes products for handling voice communications or data communications. The term Data Terminal Equipment (DTE) is used generically in referring to "Dumb" terminals, Intelligent Work Stations (IWS), etc. The communications link carrying digital data is typically the telephone voice channel that basically was designed for voice communication between the calling customer and the called customer. The telephone system does however serve effectively for both voice and data applications. To transmit binary data, the binary data signal is converted from a digital format to an analog format by a modulator. At the receiver end, a demodulator extracts the binary data from the transmitted signal. Any CPE connected to the phone line must go through a Data Access Arrangement (DAA) which provides protection for the CPE from line transients. All CPE and DAA must meet FCC specifications to avoid the CPE disturbing the telephone system.

CPE installations that include products which both transmit and receive binary data are generally connected to the telephone system through a device or circuit that performs both the MOdulation/DEModulation function. These devices are referred to as Data MODEMs. An RS-232 type cable normally connects an external stand alone MODEM to the DTE such as an Intelligent Work Station (IWS). A conventional telephone line cord is used to connect the MODEM to the customer loop. The modem function is sometimes packaged internally of the IWS.

One of the newer functions being provided by many telephone companies to customers is referred to as Caller-ID (CID). The CID concept involves transmitting the telephone number, i.e. the DN of the calling party, to the called party during the power ringing phase of the call. A CID processing device connected in parallel with the handset at the customer's premises displays the DN of the calling party without the called party's CPE switching from an "On-Hook" state to an "Off-Hook" state. The CID signal is sent to the CPE from the SPCS unit that services the called party as an FKS encoded binary signal that occurs between the first and second rings of the ringing cycle of the called equipment. The CID signal processing device, connected in parallel with the phone, demodulates the received FKS CID signal to provide a binary signal that is decoded and supplied to a display. The display may be a simple Liquid Crystal Display (LCD). This allows the called party to make a more informed decision as to whether or not to answer the phone. If the customer does not answer the phone, an "Off-Hook" signal is never sent to the SPCS unit so the ringing continues until the calling party hangs up or the call is answered by the customer's answering machine. The prior art discloses a number of arrangement in which a MODEM is connected to the telephone circuit through Data Access Arrangement (DAA) circuitry and its output is connected to a personal computer of IWS through an RS-232 cable or through the internal IWS bus for internal modems. The Modem circuitry is programmed to switch automatically from the "On-Hook" state to the "Off-hook" state following a predetermined number of rings. When the Modem goes "Off-Hook", a carrier signal, normally provided by the modem, alerts the calling equipment that a connection has been established and that the transmission of data can be negotiated.

The above system can be modified to display to the operator of the IWS, information that has been stored in the computer which is related in a predetermined fashion to the CID signal of the calling party. In a typical application, a mail order merchandising enterprise established a database in which each record represents a pending customer order. A record is addressable by the DN of the customer. The data of order receipt, date of shipment or the order, and date of expected arrival are maintained for each order along with any back order information. When a customer calls, the modem is initially connected to the system to receive and decode the CID signal. The decoded CID is transferred to the IWS where it is used to retrieve the corresponding record from the data base and to display it to the IWS operator. The operator then picks up the phone for voice communication with the customer and is in a position to immediately provide answers on the order status through. The operator's phone is connected to the telephone system in parallel with the modem. If the CID is not located in the database, the call is assumed to be a new order and is directed accordingly.

Since the standard CID signal is only transmitted between the first and second rings, when the telephone is connected in parallel with the CID processing device, there is a possibility for a party who is unfamiliar with the answering protocol to answer the call on the first ring and defeat the receipt of the CID. It is therefor desirable not to actuate the telephone ringing circuit until after the CID has been processed.

The present invention is therefore directed to providing a CID processing arrangement, at the CPE interface to the SPCS unit of the telephone system, that keeps the CPE "On-Hook" until after the CID signal is detected and processed and allows the telephone or other CPE to be selectively connected to the system only after the CID signal is processed.

A system and method which would provide automatic responses to calling parties based on selection criteria contained in CID addressable records of a database executed by an IWS would be advantageous. Applications similar to the above example of the merchandising enterprises that displays data to the IWS operator based on CID signal data could eliminate personal responses to many calls where the caller merchandise, for example, had already been shipped. An automatic voice response, stating the date of shipment and expected date of arrival could be provided based on data stored in the database and the processing of an algorithm involving the various date relationships. For example, if the database included data on when the order had been shipped, criteria could be established that could select a response statement setting forth the shipping date. Such criteria could, for example, consider the order date, the shipping date, the shipping time to the destination, the current date and an algorithm to test the time relationship among the criteria. If the time relationship was met, the "order shipping date" response would conclude with directions to the caller to follow, if the response was not adequate or additional information was required.

The present invention is therefore also directed to a system and method for providing an automatic voice response to a telephone call based on the CID of the calling party and other criteria that are employed to select at least one response from a plurality of stored responses. The present invention is readily distinguished from and should not be confused with, CPE equipment that does a call screening function based on the entry by the calling party, of a Password or Personal ID (PID) type data, after the receiving equipment switches to an "Off-Hook" state.

SUMMARY OF THE INVENTION

An object of this invention to provide a circuit to selectively control the connection of CPE to a telephone system based on the origin of the call.

Another object of this invention is to provide a security capability that can identify and qualify a telephone caller to automatically decide whether to proceed to an "Off-Hook" status and allow access to data sevices.

Another object is to provide a system and method to provide a unique automatic response to an incoming telephone call that is selected based on selection criteria which includes at least a DN corresponding to a received CID signal.

In accordance with this invention, an improved data modem includes the ability to detect Caller ID and use the information to select a specified action that is dependent on the ID. By providing only one relay without any other additional parts, the Caller ID is connected to the data modem in a simple manner. During operation, a timer is started in the modem controller at the end of the first ring when a ring signal is detected. Approximately 500 milliseconds (ms) later the controller signals the Caller ID relay to close for a period of about 200 ms and then open again. During the time the relay is closed, the modem is set up to detect the FSK signals used to send the Caller ID signal. The modem controller then sends the decoded Caller ID to the host terminal for further processing or acts upon its own to cause a specified action.

In one embodiment of this invention, the TIP and Ring lines from a telephone system wall jack are connected to the telephone handset through a pair of relays. The relays are operated from a CID processing circuit whose inputs are connected directly to the TIP and Ring lines from the wall jack. The function of the processing circuit is to control the response of CPE, i.e. the telephone, during various phases of the incoming call. For example, during the power ringing phase of an incoming call, the processing circuit insures that the CPE equipment remains in the "On-Hook" state. During the power ringing phase, the SPCS unit transmits the CID signal to the called CPE, normally between the first and second rings. The processing circuit includes a CID signal demodulator connected to receive the CID. The demodulator detects the FSK CID signal transmitted from the SPCS unit and converts it to a corresponding binary data signal which may be displayed to the customer. Once the DN corresponding to the decoded CID signal is displayed, the customer is then in position to make an informed decision relative to answering the call. The processing circuit then operates the relays connecting the telephone to the telephone system so the customer can either answer the call or ignore it or if there is an answering machine, let the answering machine respond in the normal fashion. In a modification of the above described arrangement, the processing circuit is provided with a memory to store a list of either acceptable DNs or a list of unacceptable DNs. A compare circuit is also included to compare the DN of the calling party against the stored list. An indication is then provided to the customer that the call is "approved" or "disapproved". The device can be programmed to prevent the ringing or not connect the phone when an unacceptable DN is detected.

In a second embodiment a modem function associated with an Intelligent Work Station (IWS) that transmits data and/or voice messages over the telephone system is provided. The processing circuit allows the CID signal to be supplied to the modem without switching the modem to an "Off-Hook" state. The decision as to whether to respond to the call by going Off-Hook and the type of response to provide can then be automated by suitably programming the IWS. The processing circuit prevents the normal ring detector of the accompanying telephone from operating while a relay response to the first ring is closed connecting the telephone line to the modem without making a direct current connection since that would signal the SCPS unit that an "Off-Hook" condition has occurred, and would terminate the ringing phase of the call. The CID signal normally transmitted immediately after the first ring is demodulated and forwarded to the IWS. The IWS includes a database program including a plurality of CID addressable multifield records which contain criteria for selecting from one or more programmed automatic responses. Depending on the response selected by the IWS, selective communication functions of which the modem is capable (fax, data, voice) or other CPE equipment is activated under the control of the IWS, including operation the appropriate relays to connect the CPE that is to provide the response, to the phone system.

BRIEF DESCRIPTION OF THE DRAWING

The invention will be described in greater detail with reference to the drawing in which:

FIG. 1 illustrates, in block diagram form, a state of the art telephone system that provides a CID service to customers having a different CPE and in which the present invention may be used advantageously;

FIG. 2 illustrates the connection of a conventional telephone to the system in accordance with known prior art;

FIG. 3A illustrates the connection of the combination of a CID processing circuit and a conventional telephone;

FIG. 3B illustrates the details of the CID processing arrangement shown in FIG. 3A;

FIG. 3C shows the details of the Data Access Arrangement block shown in FIG. 3B;

FIG. 4 illustrates a data modem that is connected to an IWS which performs the CID processing;

FIG. 5 is a flow chart setting forth the various steps performed by the system shown in FIG. 4.

DESCRIPTION OF THE PREFERRED EMBODIMENT

FIG. 1 illustrates in block form a conventional telephone system which includes a first SPCS1 unit and a second SPCS2 unit which are interconnected by a telephone link (represented by dashed lines). A plurality of CPE installations CPE 1 through CPE N-1 and CPE 2 through CPE N are connected to the respective SPCS units. The SPCS/CPE interface shown in FIG. 1 is defined in detail in a document designated TR-TSY-000030, issue 1, November 1988 published by Bell Communications Research INC. (Belcore). The interface provides the capability for transmission of data from a SCPS unit, to which a calling party is connected, to CPE over a normal telephone line. The signalling interface between the SCPS unit and the CPE is arranged to provide simplex data transmission from the terminating SCPS unit to the CPE, when the customer is in an "On-Hook" state. When power ringing is used, the data transmission occurs during the silent interval between the first and second rings. Specific technical details can be found in the referenced publication. If a called party answers an incoming call during CID data transmission, the transmission is stopped at the point of interruption and the data is not retransmitted.

FIG. 2 represents the conventional prior art connection of a telephone 20 to a telephone jack 21 located at the customers premises. The jack 21 is connected to the SPCS1 unit of FIG. 1. To complete a call to the telephone 20, the SPCS unit sends a ringing signal to jack 21. If the telephone is not connected to the jack, the ringing signal cannot be received. The phone line is "dead". If the telephone 20 is connected to the jack 21, the ringing signal causes the phone to ring and the circuit is completed back to the SPCS1 unit when the customer picks up the receiver. The SPCS1 unit detects the "Off-Hook" status, stops the ringing and establishes a voice path back to the caller. If the called customer does not pick up the receiver, the ringing signal continues until the calling party hangs up their telephone which terminates the call. The CID signal sent between the first and second rings has no effect on a CPE installation that is not provided with CID signal processing circuitry.

FIG. 3A illustrates in block form a CPE which includes a telephone 30 and a CID signal processing arrangement 31. The CID signal processing arrangement 31 is shown in detail in FIG. 3B and includes Data Access Arrangement block 33, having its T and R input lines connected to wall jack 32 and its output connected to FSK Demodulator 36. The ring line 34 from DAA block 33 is also connected to control logic 35, as is the output of demodulator 36. A pair of relays Ry1 and Ry2 connect telephone jacks J1 and J2 to the wall jack 32. The respective coils Rc1 and Rc2 are connected to be energized from logic 35. An LCD display device 36 may be connected to logic 35.

The function of DAA block 33, the details of which are shown in FIG. 3C, is to provide termination, isolation and protection as required by the Federal Communication Commission (FCC). The FCC requires that CPE connecting to the public switched telephone network meet stringent regulations in order to protect the network from damage caused by poorly designed or failing equipment. The crucial regulations are detailed in Part 68 of the FCC regulations. For example, isolation is required between the telephone and CPE that can withstand 1500 volts. Isolation for voice and data equipment is generally achieved with a transformer having a breakdown voltage of at least 1500 volts. The signal path for the ring detection often includes an optocoupler which must be able to withstand 1500 volts.

With reference to FIG. 3B, the CID processing arrangement may also be provided with a memory 40, a compare circuit 41, and a keypad 42 for entering DN data into memory 40. The inputs to compare circuit 41 are from the memory 40 and the CID demodulator 36. The output of a compare circuit 46 is connected to the display device 37. The memory 40 operates also to store the CID of each incoming call, or at least those calls that were not answered.

The operation of the CPE shown in FIGS. 3A-3C will now be described. It should be assumed that relays Ry1 and Ry2 are normally closed so that the telephone connected to jacks J1 and J2 are available to place outgoing calls. An incoming call causes the ring detector 39 to pull line 34 to a low state which causes logic circuit 35 to energize relay coils RC1 and RC2 thereby switching RY1 and RY2 to an open state. The telephone connected to jacks J1 and J2 are therefore inoperable, and hence there will be no audible ringing.

After the first ring, the CID signal is received by the demodulator 36 which converts the signal to a binary signal which is transferred to the logic circuit 35 and then to the display device 27 where the DN corresponding to the CID signal is displayed. The logic circuit 35 compares the DN to the stored DN and decides whether to deenergize RY1 and RY2. If the relays are deenergized, jacks J1 and J2 and their respective telephones are reconnected to the phone line. Alternatively the logic circuit can deenergize the relays just prior to the second ring. By viewing the displayed DN the Called party can make a more intelligent decision as to whether or not to answer the phone. If the phone is not answered, no record of the call is made. The phone stops ringing when the calling party terminates the call.

In the modified embodiment shown in FIG. 3B, which employs the memory 40, the keypad 42, and the compare logic 41, it should be assumed that the customer has entered a list of DNs that should or should not be answered. The operation of the modified system is similar to the basic system except that the detected CID signal is supplied as one input to the compare logic 41 while the memory 40 is scanned to provide the list of DNs representing calls to be answered or ignored. If a match is found, the display device receives an appropriate indication alerting the customer to answer to ignore the phone. If no match is found the logic circuit 41 provides a different indication to the display device 37 and proceeds to reconnect J1 and J2 to the telephone line. The DN of the calling party may be stored in memory 40 and subsequently displayed to the customer. The display, compare keypad and memory function could also be provided by the IWS in the basic configuration.

FIG. 4 shows an embodiment of the invention in which the function of the CID processing circuit shown in FIG. 3 is controlled by an IWS to permit automatic responses to be developed selectively based on the received CID data and other criteria that have been predetermined. The arrangement is similar to that shown in FIG. 3B in that a Data Access Arrangement 63 is connected to a telephone jack 62 and a pair of telephone jacks J1 and J2 are connected to the DAA block 63 through a pair of relays RY1 and RY2. A data modem 66 connects a control Microprocessor (CM) 65 to DAA block 63. Relay coils RC1 and RC2 are energized under the control of IWS 69. A ring indicator line 68 from the DAA 63 indicates to the CM 65 and IWS 69 that an incoming call is to occur so that CM 65 can energize the relay coils RC1 and RC2 to disconnect J1 and J2.

The IWS 69 includes a system unit and operating system that is capable of running several programs concurrently. IWS 69 also includes a display device and suitable input/output devices such as a keyboard and mouse and a printer. Sufficient storage is provided to store an application program including communication and database programs having a relatively large number of records that are addressable based on CID data that is sent with each received call. Unit 69 has the ability to store predetermined audio messages and transmit a selected message to the calling party under the control of the database program. The IWS unit 69 preferably can send and receive facsimile, voice and data signals also under the control of the application program. The details of the IWS 69, which are known in the art, are not described for purpose of convenience and clarity of disclosure.

The SPCS connected to the wall jack 62 in FIG. 4, in the process of completing a call from a CID, inaugurates the power ringing phase of the call. DAA 63 detects the power ringing and raises the RI line 68. The IWS 69 senses that RI line 68 has changed and interrupts the program being currently executed. The interrupt handler determines that the interrupt was caused by RI line 68 and energized RC1 and RC2 which disconnects J1 and J2 from DAA block 63. The SPCS sends the CID of the calling party after the first ring. Modem 66 detects and converts the transmitted CID signal to a binary DN that is supplied to the IWS. The database program searches for the record corresponding to the CID. Upon finding the record, the designated criteria are processed. The call is then qualified so that an automatic response provided. The system branches to a designated response program that initiates the transmitting of a prestored message to a predetermined list of individuals. The system then returns to its initial state to await the next call. The jacks J1 and J2 are reconnected to the line when the IWS deenergizes RC1 and RC2.

The invention allows going on-line in a data answer mode, connecting in a facsimile mode, sending a stored voice message, connecting or disconnecting a local telephone, calling back the calling ID number after a specified delay, among other things. While a preferred embodiment of the invention has been disclosed, it will be apparent to persons skilled in the art that changes and modifications may be made therein without departing from the spirit of the invention and the scope of appended claims.

What is claimed is:

1. Apparatus comprising:
   a computer;
   a data access arrangement having input circuitry connected to a telephone line port and including first and second electronic switches, closure of the first electronic switch establishing an AC coupling between the input circuitry of the data access arrangement and the telephone line port and closure of the second electronic switch establishing a DC coupling between the input circuitry of the data access arrangement and the telephone line port;
   a modem connected to the computer and the data access arrangement; and
   means associated with the modem for electronically;
   receiving a first ring signal from the data access arrangement;
   after the first ring signal ceases, causing closure of the first electronic switch to connect the modem through the data access arrangement to the telephone line port during a time in which a caller ID signal is specified to be transmitted;
   comparing a calling telephone number received and demodulated by the modem to a list of stored telephone numbers; and
   only if a match is found, causing closure of the second electronic switch, the modem remaining connected through the data access arrangement to the telephone line port, to draw an off-hook current preparatory to a call being connected to the modem on the telephone line port.

2. The apparatus of claim 1 further comprising a voice circuit and a third electronic switch, closure of the third electronic switch causing the voice circuit to be connected to the telephone line port and the modem to be disconnected from the telephone line port, wherein said means associated with the modem is further for causing closure of the third electronic switch if the comparing step does not result in a match.

3. The apparatus of claim 2 wherein the computer includes means for recording in an organized fashion telephone numbers received and demodulated by the modem.

* * * * *